United States Patent
Sun et al.

(10) Patent No.: US 9,906,784 B2
(45) Date of Patent: Feb. 27, 2018

(54) METHOD AND APPARATUS FOR ACQUIRING VIDEO CODING COMPRESSION QUALITY

(71) Applicant: Huawei Technologies Co., Ltd., Shenzhen, Guangdong (CN)

(72) Inventors: Lina Sun, Shenzhen (CN); Shan Gao, Shenzhen (CN); Qingpeng Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 437 days.

(21) Appl. No.: 14/583,478

(22) Filed: Dec. 26, 2014

(65) Prior Publication Data

US 2015/0110204 A1    Apr. 23, 2015

Related U.S. Application Data

(63) Continuation of application No. PCT/CN2013/081818, filed on Aug. 20, 2013.

(30) Foreign Application Priority Data

Aug. 21, 2012  (CN) .......................... 2012 1 0299000

(51) Int. Cl.
  *H04N 17/02*    (2006.01)
  *H04N 7/12*     (2006.01)
  (Continued)

(52) U.S. Cl.
  CPC .......... *H04N 17/02* (2013.01); *H04N 17/004* (2013.01); *H04N 19/102* (2014.11); *H04N 19/14* (2014.11);
  (Continued)

(58) Field of Classification Search
  CPC .... H04N 17/02; H04N 17/004; H04N 19/146; H04N 19/102; H04N 19/14; H04N 19/159
  (Continued)

(56) References Cited

U.S. PATENT DOCUMENTS 7,020,198 B2 *  3/2006  Wang ............... H04N 21/23655
                                                375/240.12
7,965,203 B2    6/2011  Yamagishi et al.
(Continued)

FOREIGN PATENT DOCUMENTS

CN    101448175 A    6/2009
CN    101635846 A    1/2010
(Continued)

OTHER PUBLICATIONS

"Parametric non-intrusive assessment of audiovisual media streaming quality—Lower resolution application area", Recommendation ITU-T P.1201.1, Oct. 2012, 49 pages.
(Continued)

*Primary Examiner* — Hee-Yong Kim

(57) ABSTRACT

Embodiments of the present invention disclose a method and an apparatus for acquiring video coding compression quality. The method may include: acquiring video stream information; calculating video content complexity according to the video stream information; and calculating video coding compression quality according to the bit rate, the frame rate and the video content complexity. In the embodiments of the present invention, the video coding compression quality may be acquired as long as the video frame information, the bit rate, the frame rate and the video content complexity of a video stream are acquired. The video coding compression quality may be used in subsequent video quality assessment. This process greatly reduces video quality assessment complexity and the assessment may be performed in real time.

(Continued)

In addition, the assessed coding compression quality meets the subjective feeling of human eyes better.

26 Claims, 8 Drawing Sheets

(51) Int. Cl.
| | | |
|---|---|---|
| H04N 11/04 | (2006.01) | |
| H04N 11/02 | (2006.01) | |
| H04N 5/91 | (2006.01) | |
| H04N 19/89 | (2014.01) | |
| H04N 17/00 | (2006.01) | |
| H04N 21/44 | (2011.01) | |
| H04N 19/159 | (2014.01) | |
| H04N 19/102 | (2014.01) | |
| H04N 19/14 | (2014.01) | |
| H04N 19/146 | (2014.01) | |

(52) U.S. Cl.
CPC ......... *H04N 19/146* (2014.11); *H04N 19/159* (2014.11)

(58) Field of Classification Search
USPC .................................................. 375/240.26
See application file for complete search history.

(56) References Cited

U.S. PATENT DOCUMENTS

| | | | |
|---|---|---|---|
| 8,885,050 B2 | 11/2014 | Wang et al. | |
| 8,917,777 B2 | 12/2014 | Xie et al. | |
| 9,319,670 B2* | 4/2016 | Sun | H04N 17/004 |
| 2006/0227250 A1* | 10/2006 | Barbieri | G11B 27/28 348/700 |
| 2007/0019873 A1 | 1/2007 | Tzannes et al. | |
| 2008/0025400 A1 | 1/2008 | Sugimoto et al. | |
| 2008/0291842 A1 | 11/2008 | Isambart et al. | |
| 2008/0317111 A1 | 12/2008 | Davis | |
| 2009/0138932 A1 | 5/2009 | Bauchot et al. | |
| 2009/0244289 A1 | 10/2009 | Raake et al. | |
| 2010/0008241 A1 | 1/2010 | Gustafsson et al. | |
| 2010/0166388 A1 | 7/2010 | Ushiki | |
| 2010/0284295 A1 | 11/2010 | Yamagishi et al. | |
| 2011/0085605 A1 | 4/2011 | Xie et al. | |
| 2012/0020415 A1 | 1/2012 | Yang et al. | |
| 2012/0201310 A1 | 8/2012 | Yamagishi et al. | |
| 2013/0162841 A1 | 6/2013 | Gustafsson et al. | |
| 2013/0314553 A1 | 11/2013 | Sun et al. | |
| 2014/0286441 A1* | 9/2014 | Zhang | H04N 17/004 375/240.27 |
| 2015/0138373 A1 | 5/2015 | Garcia et al. | |

FOREIGN PATENT DOCUMENTS

| | | |
|---|---|---|
| CN | 101790107 A | 7/2010 |
| CN | 102158729 A | 8/2011 |
| CN | 102740108 A | 10/2012 |
| EP | 2 018 069 A1 | 1/2009 |
| EP | 2 229 001 A1 | 9/2010 |
| EP | 2 296 379 A1 | 3/2011 |
| JP | 2007019802 A | 1/2007 |
| JP | 2008301026 A | 12/2008 |
| JP | 2009044393 A | 2/2009 |
| JP | 2009518915 A | 5/2009 |
| JP | 2009-188969 A | 8/2009 |
| JP | 2009273010 A | 11/2009 |
| JP | 2009273013 A | 11/2009 |
| JP | 2010507324 A | 3/2010 |
| JP | 2011-004354 A | 1/2011 |
| JP | 2011015165 A | 1/2011 |
| JP | 2011510562 A | 3/2011 |
| JP | 2015-533269 A | 11/2015 |
| KR | 1020090014721 A | 2/2009 |
| KR | 1020100095455 A | 8/2010 |
| KR | 101008608 B1 | 1/2011 |
| KR | 10-2012-0054092 | 5/2012 |
| WO | 2008048155 A1 | 4/2008 |
| WO | WO 2012/076202 A1 | 6/2012 |

OTHER PUBLICATIONS

"Parametric non-intrusive assessment of audiovisual media streaming quality—Higher resolution application area", Recommendation ITU-T P.1201.2, Oct. 2012, 55 pages.

"Parametric non-intrusive assessment of audiovisual media streaming quality", Recommendation ITU-T P.1201, Oct. 2012, 29 pages.

"Parametric non-intrusive assessment of audiovisual media streaming quality—Amendment 2: New Appendix III—Use of ITU-T P.1201 for non-adaptive, progressive download type media streaming", Recommendation ITU-T P.1201 (2012—Amendment 2, Oct. 2012, 25 pages.

Hwangjun Song, et al., "Rate Control for Low-Bit-Rate Video via Variable-Encoding Frame Rates", IEEE Transactions on Circuits and Systems for Video Technology, vol. 11, No. 4, Apr. 2001, p. 512-521.

Yuji Yoshimura et al., "PageRank Based User-Centric Content Delivery System", Technical Report of the Institute of Electronics, Information, and Communication Engineers, Mar. 5, 2012, p. 2-12.

Garcia, et al., "Impairment-Factor-Based Audio-Visual Quality Model for IPTV", Proceedings of International Workshop on Quality of Multimedia Experience (QoMEX 2009), Jul. 29-31, 2009, pp. 1-6.

"Series H: Audiovisual and Multimedia Systems, Infrastructure of Audiovisual Services—Coding of Moving Video, Advanced Video Coding for Generic Audiovisual Services," ITU-T, Telecommunication Standardization Sector of ITUH.264, Mar. 2010, 676 pages.

Series H: Audiovisual and Multimedia Systems, Infrastructure of Audiovisual Services—Transmission Multiplexing and Synchronization, Information Technology—Generic Coding of Moving Pictures and Associated Audio Information: Systems, ITU-T, Telecommunication Standardization Sector of ITU, H.220.0, May 2006, 190 pages.

"Information Technology—Coding of Audio-Visual Objects—Part 2: Visual," International Standard, ISO/IEC 14496-2, Second Edition, Dec. 1, 2001, 536 pages.

Kikuchi, Y., et al., "RTP Payload Format for MPEG-4 Audio/Visual Streams," RFC 3016, Nov. 2000, 23 pages.

Wenger, S., et al., "RTP Payload Format for H.264 Video," RFC 3984, Feb. 2005, 84 pages.

Fuzheng Yang et al., "No-Reference Quality Assessment for Networked Video via Primary Analysis of Bit Stream", IEEE Transactions on Circuits and Systems for Video Technology, vol. 20, No. 11, Nov. 2010, 11 pages.

A. Raake et al., "T-V-Model: Parameter-Based Prediction of IPTV Quality", IEEE, Mar. 31, 2008, pp. 1149-1152.

Xiangchun Tan, et al., "Perceived Video Streaming Quality under Initial Buffering and Rebuffering Degradations", Jun. 5, 2006, 8 pages.

\* cited by examiner

METHOD AND APPARATUS FOR ACQUIRING VIDEO CODING COMPRESSION QUALITY

CROSS-REFERENCE TO RELATED APPLICATION

This application is a continuation of International Application No. PCT/CN2013/081818, filed on Aug. 20, 2013, which claims priority to Chinese Patent Application No. 201210299000.7, filed on Aug. 21, 2012, both of which are hereby incorporated by reference in their entireties.

TECHNICAL FIELD

The present invention relates to the field of data processing technologies, and in particular, to a method and an apparatus for acquiring video coding compression quality.

BACKGROUND

With the development of network technologies, video on demand, web TV, video telephone and the like have become main services of a broadband network, and these services will also become main services of the 3rd generation (3G) wireless network. In the context of rapid development of network videos, how to conveniently and effectively assess the quality of network videos has become an important issue that needs to be solved urgently in network video applications.

In the prior art, network video quality assessment methods include a full-reference video quality assessment method. This method assesses the quality of a video by using a manner of calculating a peak signal to noise ratio (PSNR), and a process of the method generally includes: acquiring an original reference video and a terminal video; comparing the original reference video with the terminal video to calculate a PSNR; and determining the video quality according to a specific value of the PSNR.

However, in this method, it is required to acquire a complete original reference video and a terminal video, and to profoundly and completely analyze a video stream, and therefore the assessment is highly complex and the video quality assessment cannot be performed in real time.

SUMMARY

Embodiments of the present invention provide a method and an apparatus for acquiring video coding compression quality, which may reduce assessment complexity and may allow real-time video quality assessment, in order to solve a problem in the prior art.

To solve the foregoing technical problem, the embodiments of the present invention disclose the following technical solutions:

According to one aspect, an embodiment of the present invention provides a method for acquiring video coding compression quality, including:

acquiring video stream information, where the video stream information includes a video frame type, a video frame size, a frame rate and a bit rate;

calculating video content complexity according to the video stream information, where the video content complexity includes temporal complexity, or space complexity, or both the temporal complexity and the space complexity; and calculating video coding compression quality according to the bit rate, the frame rate and the video content complexity.

Further, the acquiring video stream information includes:

acquiring the video frame type, the video frame size and the frame rate; and determining the bit rate according to a ratio of the total data volume of the video stream to the predetermined time period.

Further, the total data volume of the video stream is a sum of the data volume of received video stream and the data volume of lost video stream.

Further, when the video content complexity includes temporal complexity, the calculating video content complexity according to the video stream information includes:

calculating an average size of I frames within the predetermined time period according to the video frame type and the video frame size; and determining the temporal complexity according to a ratio of the bit rate to the average size of the I frames; and when the video content complexity includes space complexity, the calculating video content complexity according to the video stream information includes:

calculating an average size of P frames within the predetermined time period according to the video frame type and the video frame size; and determining the space complexity according to a ratio of the bit rate to the average size of the P frames.

Further, the temporal complexity is specifically:

$$TCC = \mathrm{Min}\left(\sqrt{\left(\frac{BR}{ABI}\right)/a_0},\ 1\right),$$

where TCC is the temporal complexity, BR is the bit rate, ABI is the average size of I frames, and $a_0$ is a constant.

Further, the video stream information further includes a video frame quantization parameter;

when the video content complexity includes temporal complexity, the calculating video content complexity according to the video stream information includes:

calculating the number of bits of each pixel of P frames in a case of the video frame quantization parameter according to the video frame type; and calculating the temporal complexity according to the number of bits of each pixel of the P frames and a first parametric value corresponding to the video frame quantization parameter;

when the video content complexity includes space complexity, the calculating video content complexity according to the video stream information includes:

calculating the number of bits of each pixel of I frames in a case of the video frame quantization parameter according to the video frame type; and calculating the space complexity according to the number of bits of each pixel of the I frames and a second parametric value corresponding to the video frame quantization parameter.

Further, before calculating video coding compression quality according to the bit rate, the frame rate and the video content complexity, the method further includes:

calculating a modified bit rate according to the bit rate and the frame rate;

the calculating video coding compression quality according to the bit rate, the frame rate and the video content complexity includes:

calculating the video coding compression quality according to the modified bit rate, the frame rate and the video content complexity.

Further, the calculating a modified bit rate according to the bit rate and the frame rate includes:

determining a smaller value between the acquired frame rate and a reference frame rate; and determining the modified bit rate according to a ratio of the bit rate to the smaller value.

Further, the modified bit rate is specifically:

$$MBR = \frac{BR}{\text{Min}(fps, 30)} \cdot 30,$$

where MBR is the modified bit rate, BR is the bit rate, fps is the frame rate, and 30 is the reference frame rate.

Further, the calculating the video coding compression quality according to the modified bit rate, the frame rate and the video content complexity includes:

calculating a video coding compression distortion according to the modified bit rate, the video content complexity and a video quality assessment parameter; and calculating the video coding compression quality according to the video coding compression distortion and the frame rate.

Further, when the video content complexity includes space complexity only, the video coding compression distortion is specifically:

$$VD_c = \frac{MOS_{max} - MOS_{min}}{1 + \left(\frac{MBR}{a_1 \cdot TCC + a_2}\right)^{(a_3 \cdot TCC + a_4)}},$$

where VDc is the video coding compression distortion, MOS is the video quality assessment parameter, $MOS_{max}$ is a maximum value of the video quality assessment parameter, $MOS_{min}$ is a minimum value of the video quality assessment parameter, MBR is the modified bit rate, TCC is the temporal complexity, and $a_1$, $a_2$, $a_3$ and $a_4$ are constants.

Further, the calculating the video coding compression quality according to the video coding compression distortion and the frame rate includes:

when the frame rate is greater than or equal to 24, using a difference between the maximum value of the video quality assessment parameter and the video coding compression distortion as the video coding compression quality; or when the frame rate is less than or equal to 24, modifying, based on the video content complexity and the frame rate, a difference between the maximum value of the video quality assessment parameter and the video coding compression distortion, and using the modified result as the video coding compression quality.

Further, the video coding compression quality is specifically:

$$VMOS_c = \begin{cases} MOS_{max} - VD_c, & fps \geq 24 \\ (MOS_{max} - VD_c) \cdot \left(1 + a_5 \cdot TCC - b_5 \cdot TCC \cdot \log\left(\frac{1000}{fps}\right)\right), & fps < 24 \end{cases}.$$

According to another aspect, an embodiment of the present invention further provides an apparatus for acquiring video coding compression quality, including:

an information acquiring unit, configured to acquire video stream information, where the video stream information includes a video frame type, a video frame size, a frame rate and a bit rate;

a complexity calculating unit, configured to calculate video content complexity according to the video stream information acquired by the information acquiring unit, where the video content complexity includes temporal complexity, or space complexity, or both the temporal complexity and the space complexity; and a quality evaluating unit, configured to calculate video coding compression quality according to the bit rate and the frame rate acquired by the information acquiring unit, and the video content complexity acquired by the complexity calculating unit.

Further, the information acquiring unit includes:

a bit rate acquiring subunit, configured to: acquire the total data volume of a video stream within a predetermined time period; and determine the bit rate according to a ratio of the total data volume of the video stream to the predetermined time period.

Further, the complexity calculating unit includes:

a first time subunit, configured to: calculate an average size of I frames within the predetermined time period according to the video frame type and the video frame size when the video content complexity includes the temporal complexity; and determine the temporal complexity according to a ratio of the bit rate to the average size of the I frames; and a first space subunit, configured to: calculate an average size of P frames within the predetermined time period according to the video frame type and the video frame size obtained by the information acquiring unit when the video content complexity includes the space complexity; and determine the space complexity according to a ratio of the bit rate and the average size of the P frames.

Further, the complexity calculating unit includes:

a second time subunit, configured to, when the video stream information acquired by the information acquiring unit further includes a video frame quantization parameter and the video content complexity includes temporal complexity, calculate the number of bits of each pixel of P frames in a case of the video frame quantization parameter according to the video frame type, and calculate the temporal complexity according to the number of bits of each pixel of the P frames and a first parametric value corresponding to the video frame quantization parameter; and a second space subunit, configured to, when the video stream information acquired by the information acquiring unit further includes the video frame quantization parameter and the video content complexity includes space complexity, calculate the number of bits of each pixel of I frames in a case of the video frame quantization parameter according to the video frame type, and calculate the space complexity according to the number of bits of each pixel of the I frames and a second parametric value corresponding to the video frame quantization parameter.

Further, the apparatus further includes:

a bit rate modifying unit, configured to, before the quality evaluating unit determines, according to the bit rate, the frame rate and the video content complexity, the video coding compression quality, calculate a modified bit rate according to the bit rate and the frame rate; and the quality evaluating unit is specifically configured to calculate the video coding compression quality according to the modified bit rate acquired by the bit rate modifying unit, the frame rate and the video content complexity.

Further, the bit rate modifying unit includes:

a comparing subunit, configured to determine a smaller value between the frame rate acquired by the information acquiring unit and a reference frame rate; and a calculating subunit, configured to determine the modified bit rate according to a ratio of the bit rate to the smaller value.

Further, the quality evaluating unit includes:

a distortion calculating subunit, configured to calculate a video coding compression distortion according to the modified bit rate acquired by the bit rate modifying unit, the video content complexity and a video quality assessment parameter; and an evaluating subunit, configured to calculate the video coding compression quality according to the video coding compression distortion and the frame rate.

Further, the evaluating subunit is specifically configured to, when the frame rate is greater than or equal to 24, use a difference between the maximum value of the video quality assessment parameter and the video coding compression distortion as the video coding compression quality; or when the frame rate is less than or equal to 24, modify, based on the video content complexity and the frame rate, a difference between the maximum value of the video quality assessment parameter and the video coding compression distortion, and use the modified result as the video coding compression quality.

According to another aspect, an embodiment of the present invention further provides a terminal, including a first transceiver and a first processor, where the first transceiver is configured to receive a video stream; and the first processor is configured to: acquire video stream information from the video stream received by the first transceiver, where the video stream information includes a video frame type, a video frame size, a frame rate and a bit rate; calculate video content complexity according to the video stream information, where the video content complexity includes temporal complexity or space complexity or both the temporal complexity and the space complexity; and calculate video coding compression quality according to the bit rate, the frame rate and the video content complexity.

According to another aspect, an embodiment of the present invention further provides a terminal, including a second transceiver and a second processor, where the second transceiver is configured to send a video stream; and the second processor is configured to: acquire video stream information from the video stream sent by the second transceiver, where the video stream information includes a video frame type, a video frame size, a frame rate and a bit rate; calculate video content complexity according to the video stream information, where the video content complexity includes temporal complexity or space complexity or both the temporal complexity and the space complexity; and calculate video coding compression quality according to the bit rate, the frame rate and the video content complexity.

According to another aspect, an embodiment of the present invention further provides a server, which is located on a network side, including a third transceiver and a third processor, where the third transceiver is configured to transmit a video stream from a transmit end to a receive end; and the third processor is configured to: acquire video stream information from the video stream transmitted by the third transceiver, where the video stream information includes a video frame type, a video frame size, a frame rate and a bit rate; calculate video content complexity according to the video stream information, where the video content complexity includes temporal complexity, or space complexity, or both the temporal complexity and the space complexity; and calculate video coding compression quality according to the bit rate, the frame rate and the video content complexity.

In the embodiments of the present invention, video coding compression quality may be acquired as long as video frame information, a bit rate, a frame rate and video content complexity of a video stream are acquired. The video coding compression quality may be used in subsequent video quality assessment. In this process, it is not necessary to acquire a complete original reference video and a complete terminal video, and deeply analyze a specific MV or residual of the video stream. This process greatly reduces video quality assessment complexity and the assessment may be performed in real time. In addition, because impact of the video content characteristics (namely, video content complexity) and impact of a frame rate are considered, the assessed coding compression quality meets the subjective feeling of human eyes better.

BRIEF DESCRIPTION OF THE DRAWINGS

To describe the technical solutions in the embodiments of the present invention more clearly, the following briefly introduces the accompanying drawings required for describing the embodiments or the prior art. Apparently, a person of ordinary skill in the art may still derive other drawings from these accompanying drawings without creative efforts.

DETAILED DESCRIPTION

To enable a person skilled in the art to better understand technical solutions in embodiments of the present invention, and make the foregoing purposes, features, and advantages of the embodiments of the present invention clearer and more comprehensible, the following describes the technical solutions of the embodiments of the present invention in more detail with reference to accompanying drawings.

Figure 1:
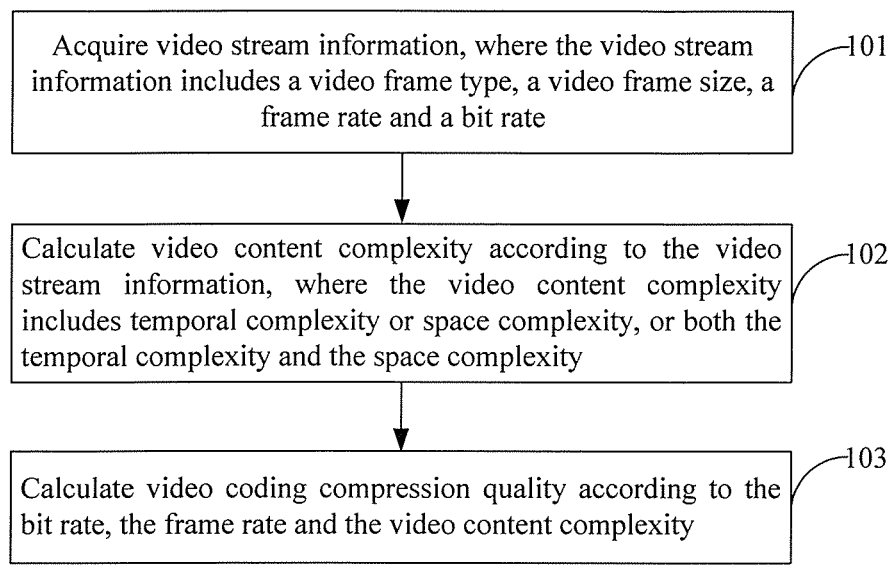
FIG. 1 is a flowchart of a first embodiment of a method for acquiring video coding compression quality according to the present invention.

Referring to FIG. 1, FIG. 1 is a flowchart of a first embodiment of a method for acquiring video coding compression quality according to the present invention.

The method provided by this embodiment of the present invention may be applied to a transmit end for sending a video stream, or may also be applied to a network side for transmitting a video stream, or applied to a receive end for receiving a video stream. The method may include:

Step 101: Acquire video streaming information, where the video stream information includes a video frame type, a video frame size, a frame rate and a bit rate.

In this embodiment of the present invention, video stream information is first acquired. The information may include a video frame type, a video frame size, a frame rate and a bit rate, and certainly may also include other information, for example, a video frame quantization parameter, and the like.

Where, the video frame type may specifically be an I frame (the I frame refers to an intraframe coding frame of a video) and a P frame (the P frame refers to an interframe coding frame of a video). A frame type may also be obtained by an existing frame type detection method or by analyzing a data stream, and the like. A size of a video frame in a video stream may be byte (byte), bit (bit) or Kbit (Kbit). When the unit of the bit rate is Kbps (Kbps), the unit of the video frame size is Kbit (Kbit).

The frame rate may be preset or obtained by network transmission, and may also be deduced according to an RTP timestamp. Time expressed by the RTP timestamp is obtained through clock frequency calculation. Frame rate=Clock frequency/Increment of RTP timestamp between two frames that are adjacent in a display order. Usually, the clock frequency of a video is 9000. The bit rate is the video data volume per second. For details about calculation, refer to the description of the following embodiments.

Step 102: Calculate a video content complexity according to the video stream information, where the video content complexity includes temporal complexity or space complexity or the temporal complexity and the space complexity.

In this embodiment of the method of the present invention, the video content complexity may include only the temporal complexity or the space complexity, and may also include both the complexities. When the temporal complexity is calculated, the temporal complexity may be specifically determined according to a size of an I frame in a video frame and the bit rate acquired in the foregoing step, and may also be determined by the number of bytes corresponding to each pixel of a P frame corresponding to a quantization parameter when the video stream information further includes the video frame quantization parameter. When the space complexity is calculated, the space complexity may be specifically determined according to a size of a P frame in a video frame and the bit rate acquired in the foregoing step, and may also be determined according to the number of bytes corresponding to each pixel of an I frame corresponding to the quantization parameter when the video stream information further include the video frame quantization parameter. For details, refer to descriptions of the following embodiments.

Step 103: Calculate video coding compression quality according to the bit rate, the frame rate and the video content complexity.

After the bit rate, the frame rate and the video content complexity are acquired, the video coding compression quality may be directly determined according to the three. A video coding compression distortion may also first be determined according to the bit rate and the video content complexity, and then the video coding compression quality is determined according to the video coding compression distortion and the frame rate.

The video coding compression quality is the basis of accurately evaluating the whole video stream quality. Based on the video coding compression quality, the quality of a network video may be assessed. Generally, relatively high video coding compression quality leads to high network video quality.

In this embodiment of the present invention, in the foregoing steps, video coding compression quality may be acquired as long as video frame information, a bit rate, a frame rate and video content complexity of a video stream are acquired. In this process, it is not necessary to acquire a complete original reference video and a complete terminal video, and deeply analyze a specific MV or residual of the video stream. This greatly reduces video quality assessment complexity and the assessment may be performed in real time. In addition, because impact of video content characteristics (namely, video content complexity) and impact of a frame rate are considered, the assessed coding compression quality meets the subjective feeling of human eyes better.

Figure 2:
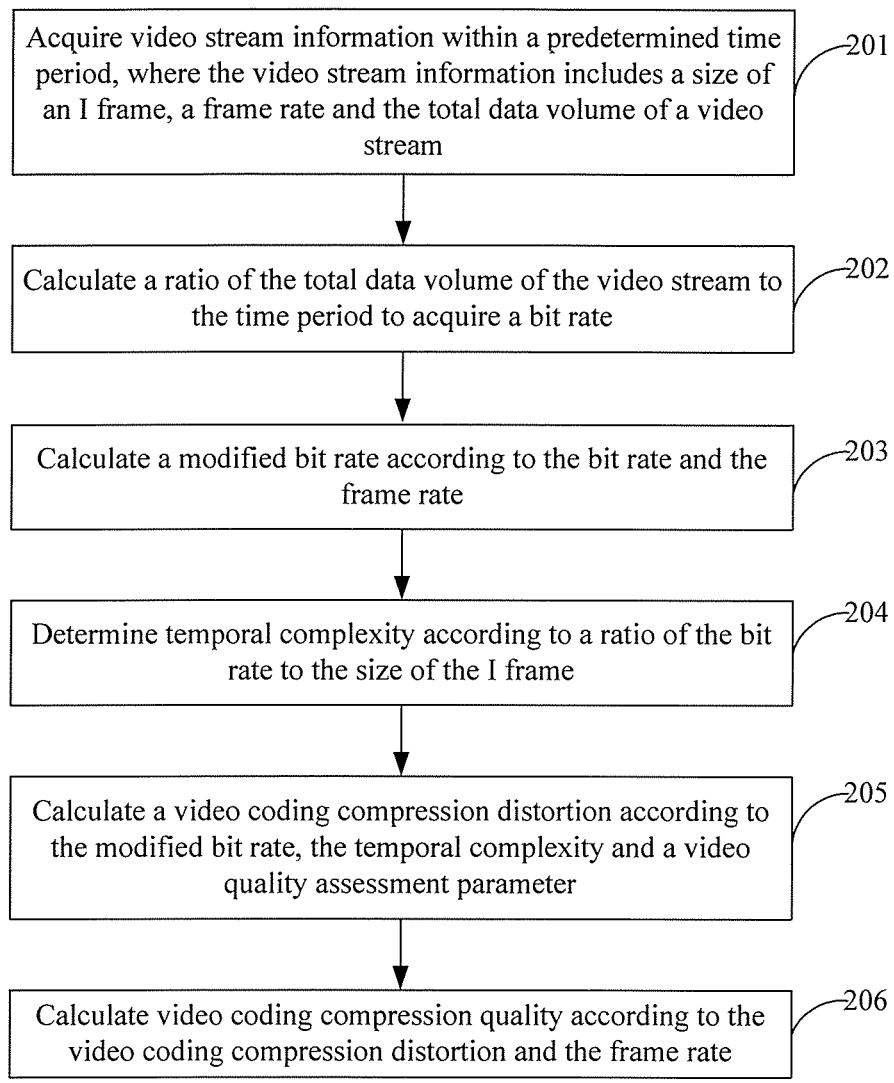
FIG. 2 is a flowchart of a second embodiment of a method for acquiring video coding compression quality according to the present invention.
Figure 3:
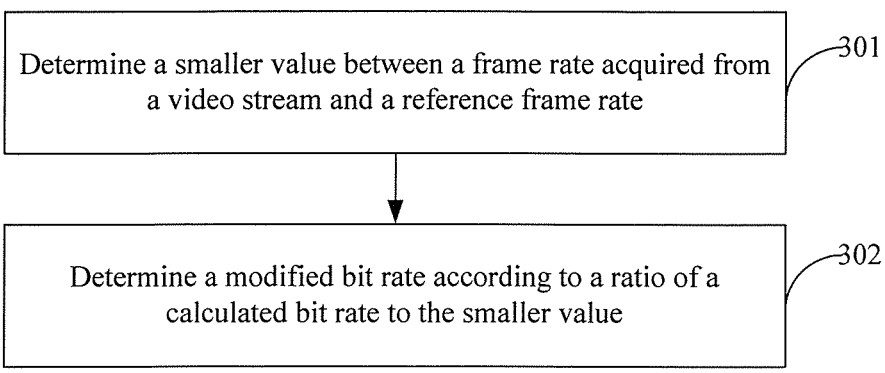
FIG. 3 is a flowchart of a method for acquiring a modified bit rate in the embodiment shown in FIG. 2.
Figure 4:
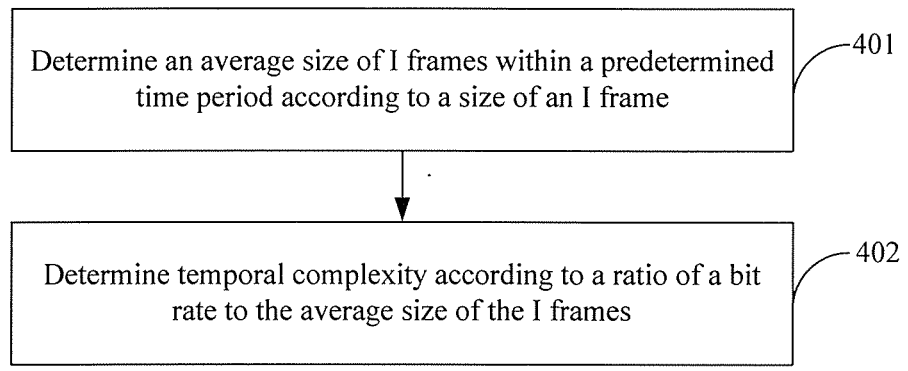
FIG. 4 is a flowchart of a method for acquiring temporal complexity in the embodiment shown in FIG. 2.

Referring to FIG. 2, FIG. 2 is a flowchart of a second embodiment of a method for acquiring video coding compression quality according to the present invention.

This embodiment is described by using an example in which the method is applied to a network side for transmitting a video stream or applied to a receive end for receiving a video stream. The method may include:

Step 201: Acquire video streaming information within a predetermined time period, where the video stream information includes a size of an I frame, a frame rate and the total data volume of a video stream.

In this step, a video stream within a certain time period is received first, where the time period is expressed as MT, and then information in the video stream is acquired:

An I frame in the video stream is acquired by using a size of a video frame or by analyzing a data stream, and the size of the I frame is further acquired;

a preset frame rate is acquired or a frame rate is acquired according to an RTP timestamp, and the frame rate is marked as fps; and it is speculated, according to a received video data packet or video frame, whether there is a lost data packet or video frame; if so, a data volume of the lost data packet or video frame is speculated, and then a sum of the data volume of the received data packet or video frame and a lost data volume is calculated, so as to acquire the total data volume of the video stream within the MT, where the total data volume is marked as $\Sigma RTPpayloadSize$ (is the total data volume of a payload of a video data packet) or $\Sigma FrameSize$ (is the total data volume of a video frame). The lost data volume may be speculated according to the data volume of the received data packet or video frame, and there may be many methods. For example, a size of the lost packet is equal to a size of a previous packet that is received correctly, or a size of the lost video frame is equal to a size of a previous frame that is received correctly.

Certainly, the foregoing video stream information may also be acquired in other manners, which is not be enumerated here.

Step 202: Calculate a ratio of the total data volume of the video stream to the time period so as to acquire a bit rate. The bit rate is $$BR = \frac{\sum RTPpayloadSize}{MT}$$

or $$BR = \frac{\sum FrameSize}{MT},$$

and the unit of the bit rate is Kbps.

Certainly, a function of the ratio of the total data volume of the video stream to the time period may also be used as the bit rate.

Step 203: Calculate a modified bit rate according to the bit rate and the frame rate.

The reduction of the frame rate may lead to improvement of single-frame image quality. Therefore, the bit rate acquired through the foregoing calculation may also be modified according to the frame rate to acquire a modified bit rate in this embodiment. Specifically, a process of acquiring a modified bit rate may include the following steps 301-302:

Step 301: Determine a smaller value between the frame rate acquired from the video stream and a reference frame rate.

Due to a persistence of vision feature of human eyes, human eyes cannot distinguish pictures more than 30 frames per second. Therefore, a frame rate of 30 may be used as s reference, that is, the reference frame rate may be 30. Certainly, other numbers may also be selected as required. Further, a smaller value, namely, Min(fps,30) is acquired.

Step 302: Determine a modified bit rate according to a ratio of the calculated bit rate to the foregoing smaller value. The modified bit rate is marked as MBR, then $$MBR = \frac{BR}{Min(fps, 30)} \cdot 30.$$

In other embodiments, another multiple or function of this ratio may also be selected as the modified bit rate.

Step 203 may be performed when it is required to use the modified bit rate, and is not limited to the order in this embodiment. In other embodiments, step 203 may be not included. That is, subsequent calculation is performed directly according to the bit rate after the bit rate is acquired, without using the modified bit rate.

Step 204: Determine temporal complexity according to a ratio of the bit rate to the size of the I frame.

When there is coding compression distortion in a video, there is a large difference between the subjective experiences of different data streams at a same bit rate due to different video content complexities, namely, different time and space complexities. Particularly in a case of a lower bit rate, the subjective experience of a data stream having rich content is obviously poor than that of a data stream having simple content. Therefore, when the video coding compression quality is calculated, the video content complexity needs to be considered. In this embodiment, a time content complexity is used as an example for description.

By a statistical analysis experiment of a large amount of data stream data, in a case of a certain bit rate, a P/B frame of a sequence of a large temporal complexity is generally greater than that of a sequence of a smaller temporal complexity, but is less than that of an average I frame. Therefore, the ratio of the bit rate Br to the average size of the I frames may reflect one of video content characteristics, namely, the temporal complexity, to a certain extent. The temporal complexity is marked as TCC.

The method for determining temporal complexity may specifically include the following steps 401-402:

Step 401: Determine an average size of I frames within a predetermined time period according to the size of the I frame.

In this step, all I frames of the video stream within a predetermined time period may be acquired, and then an average value of sizes of all the I frames is determined as the average size of the I frames. The average value may also be calculated by selecting some of the I frames. The average size of the I frames is marked as ABI.

Step 402: Determine the temporal complexity according to a ratio of the bit rate to the average size of the I frames.

Specifically, the temporal complexity may be calculated by using the following formula:

$$TCC = Min\left(\sqrt{\left(\frac{BR}{ABI}\right)/a_0}, 1\right),$$

$a_0$ is a constant.

Step 205: Calculate a video coding compression distortion according to the modified bit rate, the temporal complexity and a video quality assessment parameter.

A larger temporal complexity of a video leads to a larger compression distortion at a same bit rate. Specifically, the distortion may be calculated according to the following formula:

$$VD_c = \frac{MOS_{max} - MOS_{min}}{1 + \left(\frac{MBR}{a_1 \cdot TCC + a_2}\right)^{(a_3 \cdot TCC + a_4)}},$$

where VDc is the video coding compression distortion, MOS is the video quality assessment parameter, $MOS_{max}$ is a maximum value of the video quality assessment parameter and is the highest score of a video (5 scores if in a five-grade marking system), $MOS_{min}$ is a minimum value of the video quality assessment parameter and is the lowest score of a video (1 score if in a five-grade marking system), and $a_1$, $a_2$, $a_3$ and $a_4$ are constants.

In another embodiment, the video coding compression quality may also be acquired directly according to the modified bit rate and the temporal complexity. In another embodiment, if step 203 is not performed, the bit rate acquired in step 202 is not be modified, and the video coding compression distortion or the video coding compression quality may also be acquired directly according to the bit rate and the temporal complexity.

Step 206: Calculate video coding compression quality according to the video coding compression distortion and the frame rate.

The video coding compression quality refers to a difference between the maximum value of the video quality assessment parameter and the video coding compression distortion. However, when the frame rate of a video decreases, temporal discontinuity occurs in the video during playing. A smaller frame rate leads to more obvious discontinuity and worse compression quality. In view of impact of the frame rate, the video coding compression quality may be specifically calculated according to the following formula:

$$VMOS_c = \begin{cases} MOS_{max} - VD_c, & fps \geq 24 \\ (MOS_{max} - VD_c) \cdot \left(1 + a_5 \cdot TCC - b_5 \cdot TCC \cdot \log\left(\frac{1000}{fps}\right)\right), & fps < 24 \end{cases}.$$

When the frame rate is greater than or equal to 24, a difference between the maximum value of the video quality assessment parameter and the video coding compression distortion is used as the video coding compression quality. When the frame rate fps is less than 24, discontinuity occurs during video playing. Therefore, the compression quality deteriorates to some extent. In this case, a difference between the maximum value of the video quality assessment parameter and the video coding compression distortion is modified based on the temporal complexity, and the modified result is used as the video coding compression quality. Where, both $a_5$ and $b_5$ are constants, and a smaller frame rate or a larger temporal complexity leads to worse compression quality. In some application scenarios, for example, when the operational capability of a terminal device (network device or test device) is excessively low, specific operation results of the formulae involved in this section may be replaced by table lookups, for example, $$\log\left(\frac{1000}{fps}\right).$$

The quality of a video may be measured by the video coding compression quality.

In this embodiment of the present invention, it is not necessary to acquire a complete original reference video and a complete terminal video, and deeply and completely analyze a video stream, and video coding compression quality may be obtained to complete video quality assessment as long as information about a bit rate and a frame rate of a video stream is acquired. Assessment complexity is low, and therefore real-time assessment may be achieved. In addition, because impact of the frame rate and impact of temporal complexity in video content characteristics are considered in this method, and this method better meets perception of coding compression distortion by a visual system of human eyes.

Figure 5:
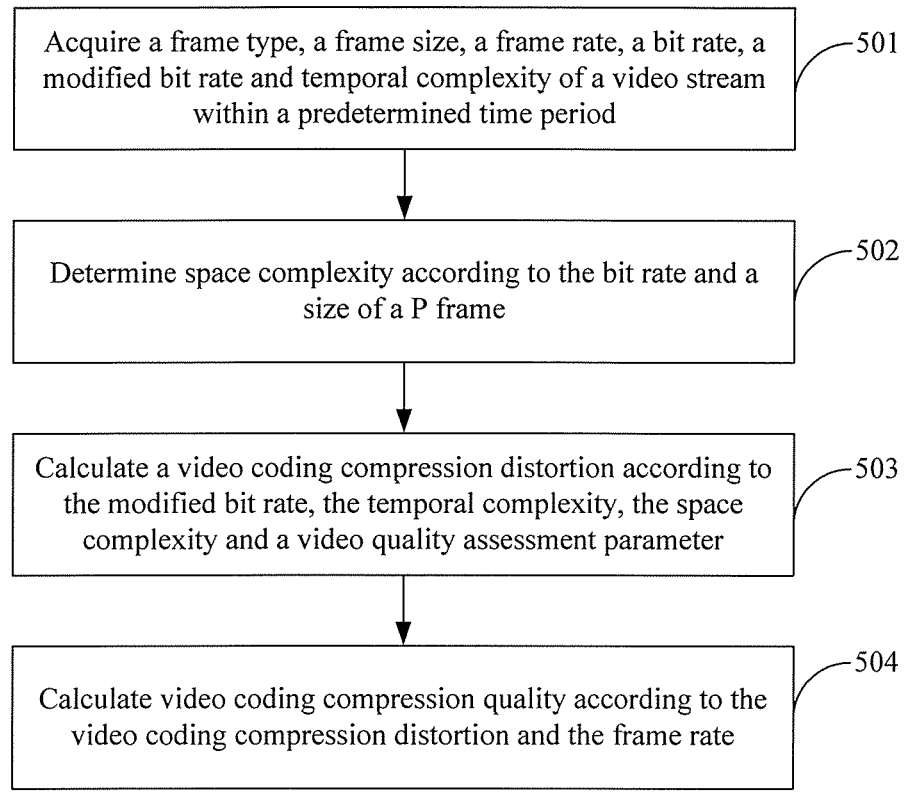
FIG. 5 is a flowchart of a third embodiment of a method for acquiring video coding compression quality according to the present invention.
Figure 6:
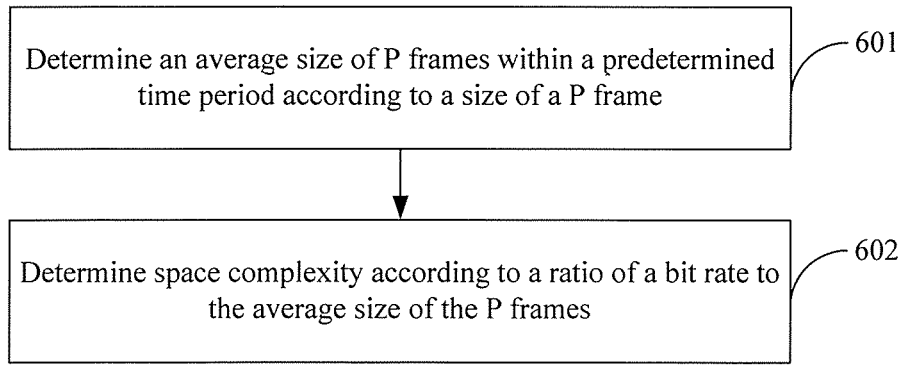
FIG. 6 is a flowchart of a method for acquiring space complexity in the embodiment shown in FIG. 5.

Referring to FIG. 5, FIG. 5 is a flowchart of a third embodiment of a method for acquiring video coding compression quality according to the present invention.

This embodiment is described by still using the example in which the method is applied to a network side for transmitting a video stream or applied to a receive end for receiving a video stream. The difference between this embodiment and the foregoing embodiment lies in that only the impact of the temporal complexity in the video content complexity is considered in the acquired video coding compression quality in the foregoing embodiment, but another characteristic of the video content complexity, namely, the space complexity, is further considered in this embodiment. The method may include the following steps:

Step 501: Acquire a frame type, a frame size, a frame rate, a bit rate, a modified bit rate and temporal complexity of a video stream within a predetermined time period are acquired.

In this step, an I frame and a P frame in the video stream may be acquired by using a size of a video frame or by analyzing a data stream, and a size of the I frame and a size of the P frame may be further acquired. In this step, the acquiring the frame rate fps, the bit rate BR, the modified bit rate MBR and the temporal complexity TCC is similar to steps 201-204 in the foregoing embodiment and is not repeated herein.

Step 502: Determine space complexity according to the bit rate and a size of a P frame.

By a statistical analysis experiment of a large amount of data stream data, in a case of a certain bit rate, an average I frame of a sequence of a larger space complexity is generally greater than that of a sequence of a smaller space complexity, but is less than that of a P/B frame. Therefore, the ratio of the bit rate Br to the average size of the P frames may reflect one of video content characteristics, namely, the space complexity, to a certain extent. The space complexity is marked as SCC.

The method for determining space complexity may specifically include the following steps 601-602:

Step 601: Determine an average size of P frames within a predetermined time period according to the size of the P frame.

In this step, the method for calculating the average size of the P frames is similar to the method for calculating the average size of the I frames in step 401 in the foregoing embodiment, and is not repeated herein. The average size of the P frames is marked as ABP.

Step 602: Determine the space complexity according to a ratio of the bit rate to the average size of the P frames.

Specifically, the space complexity may be calculated by using the following formula:

$$SCC = \text{Min}\left(\sqrt{\left(\frac{BR}{ABP}\right)/b_0}, 1\right),$$

where $b_0$ is a constant.

Step 503: Calculate a video coding compression distortion according to the modified bit rate, the temporal and space complexities and a video quality assessment parameter.

A larger temporal complexity or space complexity or both a larger temporal complexity and space complexity of a video leads to a larger the compression distortion at a same bit rate. The video coding compression distortion may be calculated according to the following formula:

$$VD_c = \frac{MOS_{max} - MOS_{min}}{1 + \left(\frac{MBR}{c_1 \cdot TCC + d_1 \cdot SCC + e_1}\right)^{(c_2 \cdot TCC + d_2 \cdot SCC + e_2)}},$$

where VDc is the video coding compression distortion, MOS is the video quality assessment parameter, $MOS_{max}$ is a maximum value of the video quality assessment parameter and is the highest score of a video (5 scores if in a five-grade marking system), $MOS_{min}$ is a minimum value of the video quality assessment parameter and is the lowest score of a video (1 score if in a five-grade marking system), and $c_1$, $d_1$, $e_1$, $c_2$, $d_2$ and $e_2$ are constants.

Step 504: Calculate video coding compression quality according to the video coding compression distortion and the frame rate.

After the video coding compression distortion is acquired, the video coding compression quality may be acquired by using the same formula as that in step 206 in the foregoing embodiment.

In this embodiment of the present invention, video coding compression quality may be obtained to complete video quality assessment as long as information about a bit rate and a frame rate of a video stream is acquired. Assessment complexity is low, and therefore real-time assessment may be achieved. In addition, because impact of the frame rate and impact of temporal complexity and space complexity in video content characteristics are considered in this method, and this method better meets perception of coding compression distortion by a visual system of human eyes.

In another embodiment of the present invention, only the impact of the space complexity SCC may be considered when the video coding compression distortion is acquired, without considering the temporal complexity TCC. In this case, the video coding compression distortion may be calculated according to the following formula:

$$VD_c = \frac{MOS_{max} - MOS_{min}}{1 + \left(\frac{MBR}{f_1 \cdot SCC + f_2}\right)^{(f_3 \cdot SCC + f_4)}},$$

where $f_1$, $f_2$, $f_3$ and $f_4$ are constants.

In view of the impact of the frame rate, the corresponding video coding compression quality may be specifically calculated by using the same formula as that in step 206 of the foregoing embodiment, so as to acquire the video coding compression quality.

Figure 7:
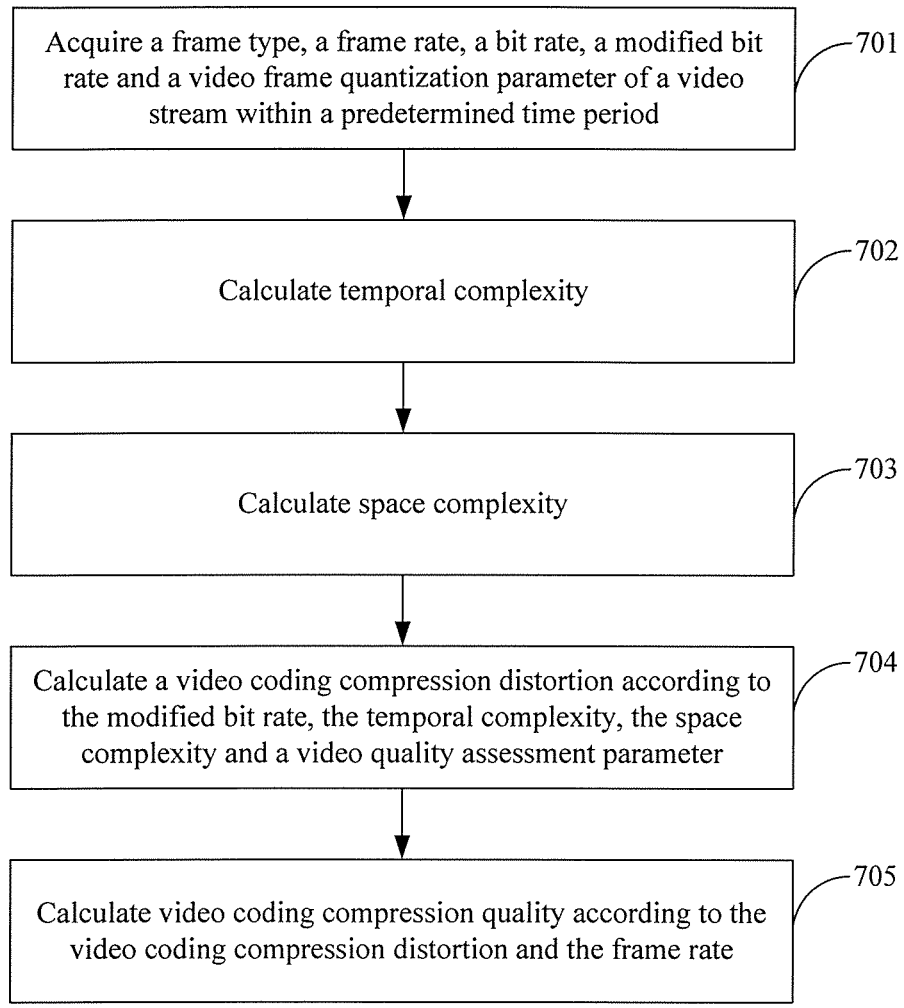
FIG. 7 is a flowchart of a fourth embodiment of a method for acquiring video coding compression quality according to the present invention.

Referring to FIG. 7, FIG. 7 is a flowchart of a fourth embodiment of a method for acquiring video coding compression quality according to the present invention.

This embodiment is described by still using an example in which the method is applied to a network side for transmitting a video stream or applied to a receive end for receiving a video stream. The difference between this embodiment and the foregoing embodiment lies in that the method for acquiring video content complexity, namely, temporal complexity and space complexity, is different from that in the foregoing embodiment. The method may include the following steps:

Step 701: Acquire a frame type, a frame rate, a bit rate, a modified bit rate and a video frame quantization parameter of a video stream within a predetermined time period.

In this step, an I frame and a P frame of a video stream may be acquired by using a size of a video frame or by analyzing a data stream, and a size of the I frame and the P frame may be further acquired. In this step, the acquiring the frame rate fps, the bit rate BR and the modified bit rate MBR is similar to steps 201-203 in the foregoing embodiment and is not repeated herein.

In this step, it is required to further acquire a quantization parameter of the video frame in the video stream, and the quantization parameter is marked as QP. The quantization parameter (QP) is an important parameter for a coding process. The setting of this parameter determines the coding quality of a video image. A larger QP leads to worse video image quality. The specific QP value may be obtained by analyzing a video stream.

Step 702: Calculate temporal complexity.

In a case of a certain QP, a larger P frame indicates a larger temporal complexity of a video. The average number of bits of each pixel of P frames (marked as ABPP) can reflect a value of the temporal complexity. The calculating temporal complexity may include:

calculating the number of bits of each pixel of P frames in a case of the video frame quantization parameter according to the video frame type; and calculating the temporal complexity according to the number of bits of each pixel of the P frames and a first parametric value corresponding to the video frame quantization parameter.

Specifically, the temporal complexity may be calculated according to the following formula:

$$TCC = h_1 \cdot ABPP + h_2,$$

where both $h_1$ and $h_2$ are first parameter values related to the QP, that is, each QP value corresponds to a group of $h_1$ and $h_2$.

The temporal complexity of a video stream may also be calculated in two ways, but is not limited to the two ways: one way is that a TCC is calculated according to the QP and ABPP of each P frame, and then the TCC of the whole video stream is acquired by using an average value calculation method; and, the second way is that an average value of QPs and an average value of ABPPs of P frames in the whole video stream are calculated, and then the TCC of the whole video stream is calculated by using the foregoing formula. For details about how to calculate temporal complexity of a single frame, refer to description of Patent Application No. 200910161628.9, with Publication No. CN101635846B, entitled "VIDEO QUALITY ASSESSMENT METHOD, SYSTEM AND APPARATUS".

Step 703: Calculate space complexity.

In a case of a certain QP, a larger I frame indicates larger space complexity of a video. The average number of bits of each pixel of I frames (marked as ABIP) can reflect a value of the space complexity. A process of calculating space complexity may include:

calculating the number of bits of each pixel of I frames in a case of the video frame quantization parameter according to the video frame type; and calculating the space complexity according to the number of bits of each pixel of the I frames and a second parametric value corresponding to the video frame quantization parameter.

Specifically, the space complexity may be calculated according to the following formula:

$$SCC = j_1 \cdot ABIP + j_2,$$

where both $j_1$ and $j_2$ are second parameter values related to the QP, that is, each QP value corresponds to a group of $j_1$ and $j_2$.

Similarly, the space complexity of a video stream may also be calculated by two ways, but is not limited to the two ways: one way is that a SCC is calculated according to the QP and ABIP of each I frame, and then the SCC of the whole video stream is acquired by using an average value calculation method; and, the second way is that an average value of QPs and an average value of ABIPs of I frames in the whole video stream are calculated, and then the SCC of the whole video stream is calculated by using the foregoing formula. For details about how to calculate temporal complexity of a single frame, refer to description of Patent Application No. 200910161628.9, with Publication No. CN101635846B, entitled "VIDEO QUALITY ASSESSMENT METHOD, SYSTEM AND APPARATUS".

Steps 702 and 703 may be exchanged in sequence, and may also be performed simultaneously.

Step 704: Calculate a video coding compression distortion according to the modified bit rate, the temporal complexity, the space complexity and a video quality assessment parameter.

Step 705: Calculate video coding compression quality according to the video coding compression distortion and the frame rate.

After the TCC and SCC are determined, the video coding compression distortion and the video coding compression quality in steps 704 and 705 may be calculated and acquired by referring to the method in steps 503-504 in the foregoing embodiment.

In another embodiment, the calculation of the video coding compression distortion and the video coding compression quality may also be performed by using only the TCC or SCC. For details about a process, refer the corresponding description in the foregoing embodiment, and is not repeated herein.

In this embodiment of the present invention, assessment complexity is reduced and therefore real-time assessment may be achieved. In addition, because impact of a frame rate and impact of temporal complexity and space complexity in video content characteristics are considered in this method, and this method better meets perception of coding compression distortion by a visual system of human eyes.

Figure 8:
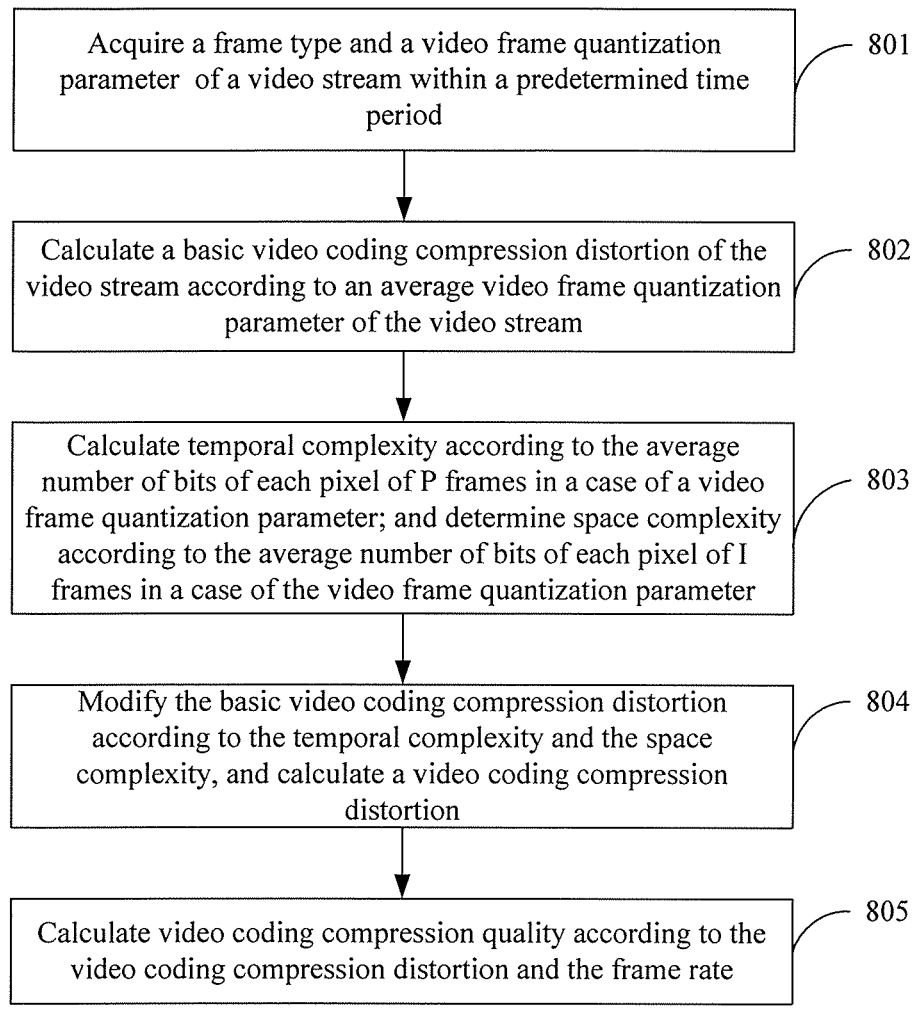
FIG. 8 is a flowchart of a fifth embodiment of a method for acquiring video coding compression quality according to the present invention.

Referring to FIG. 8, FIG. 8 is a flowchart of a fifth embodiment of a method for acquiring video coding compression quality according to the present invention.

This embodiment is described by using still an example in which the method is applied to a network side for transmitting a video stream or applied to a receive end for receiving a video stream. The method may include the following steps:

Step 801: Acquire a frame type and a video frame quantization parameter of a video stream within a predetermined time period.

In this step, an I frame and a P frame in the video stream are acquired by using a size of a video frame or by analyzing a data stream, and the quantization parameter QP of the video frame in the video stream is acquired.

Step 802: Calculate a basic video coding compression distortion of the video stream according to an average video frame quantization parameter of the video stream.

Due to the visual masking of human eyes, in a case of a certain QP, the compression distortion of a video with large temporal complexity and space complexity is relatively small. In this step, a quantization step (QPstep) is first obtained according to the QP, and then the basic video coding compression distortion $VD_c'$ is obtained by looking up a table or calculated by using a formula. The basic video coding compression distortion $VD_c'$ may be acquired specifically by using the following formula:

$$VD_c' = (MOS_{max} - MOS_{min}) \cdot func1(QP), \text{ or}$$

$$VD_c' = (MOS_{max} - MOS_{min}) \cdot func1(QPstep),$$

where func1(QP) is a function in direct proportion to the QP, func1(QPstep) is a function in direct proportion to the QPstep, both the func1(QP) and the func1(QPstep) are between 0 and 1, and may be linear or nonlinear in form, for example, $func1(QP) = k_1 + k_2 \cdot QP$.

Step 803: Calculate temporal complexity according to the average number of bits of each pixel of P frames in a case of the video frame quantization parameter, and calculate space complexity according to the average number of bits of each pixel of I frames in a case of the video frame quantization parameter.

This step is the same as steps 702-703 in the foregoing embodiment and is not repeated herein. After the temporal complexity TCC and the space complexity SCC are acquired, the next step 804 may be performed.

Step 804: Modify the basic video coding compression distortion according to the temporal complexity and the space complexity, and calculate a video coding compression distortion.

In the modification process, the basic video coding compression distortion may be modified based on the function func2(TCC,SCC) of the temporal complexity and the space complexity. Specifically, the modification may be performed by using the following formula:

$$VD_c = VD_c' \cdot func2(TCC, SCC),$$

where func2(TCC,SCC) is a function in inverse proportion to the TCC and SCC and is between 0 and 1; a larger TCC and/or SCC leads to a smaller func2(TCC,SCC); the func2(TCC,SCC) may be linear or nonlinear in form, for example, $func2(TCC,SCC) = k_3 \cdot TCC + k_4 \cdot SCC + k_5$.

Step 805: Calculate video coding compression quality according to the video coding compression distortion and the frame rate.

After the TCC, SCC and VDc are determined, the video coding compression quality may be calculated and acquired by referring to the method of step 504 in the foregoing embodiment.

In this embodiment of the present invention, video coding compression quality may be acquired to complete video quality assessment as long as information about a bit rate and a frame rate of a video stream is acquired. Assessment complexity is low, and therefore real-time assessment may also be achieved. In addition, because impact of a frame rate and impact of temporal complexity and space complexity in video content characteristics are considered in this method, and this method better meets perception of coding compression distortion by a visual system of human eyes.

In another embodiment of the present invention, only the space complexity SCC or the temporal complexity TCC may be considered when the video coding compression quality is acquired. That is, the basic video coding compression distortion may be modified by using only the function of the space complexity or only the function of the temporal complexity, and the video coding compression quality is further determined after the video coding compression distortion is acquired.

The sequence of the steps in the forgoing embodiments may be adjusted as required, but is not limited to the foregoing step sequences.

The forgoing embodiments of the method may be applied to a network side for transmitting a video stream or to a receive end for receiving a video stream so as to perform video quality assessment.

The forgoing embodiments of the method may also be applied to a transmit end of a video stream. The difference between the transmit end and the foregoing network side and the receive end lies in that, because loss of a video data packet or a video frame does not occur in the video stream information acquired by the transmit end, the total data volume of the video stream is equal to the total data volume of payloads of video data packets to be sent or the total data volume of video frames.

Those skilled in the art should clearly understand that techniques in the embodiments of the present invention may be implemented by means of software and necessary general-purpose hardware platforms. Based on such an understanding, the technical solutions of the present invention essentially, or the part contributing to the prior art, or a part of the technical solutions may be implemented in a form of a software product. The software product is stored in a storage medium, such as ROM/RAM, a magnetic disk, or an optical disc, and includes several instructions for instructing a computer device (which may be a personal computer, a server, or a network device) to perform all or some of the steps of the methods described in the embodiments of the present invention.

The forgoing are descriptions of the method embodiments of the present invention. Apparatuses for implementing the foregoing methods are described below.

Figure 9:
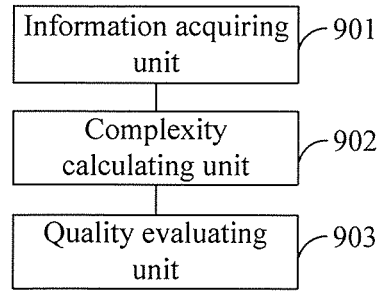
FIG. 9 is a block diagram of a first embodiment of an apparatus for acquiring video coding compression quality according to the present invention.

Referring to FIG. 9, FIG. 9 is a block diagram of a first embodiment of an apparatus for acquiring video coding compression quality according to the present invention.

The apparatus may include:

an information acquiring unit 901, configured to acquire video stream information, where the video stream information includes a video frame type, a video frame size, a frame rate and a bit rate;

a complexity calculating unit 902, configured to calculate video content complexity according to the video stream information acquired by the information acquiring unit 901, where the video content complexity includes temporal complexity or space complexity, or both the temporal complexity and the space complexity; and a quality evaluating unit 903, configured to calculate video coding compression quality according to the bit rate and the frame rate acquired by the information acquiring unit 901 and the video content complexity acquired by the complexity calculating unit 902.

The information acquiring unit 901 first acquires video stream information, where the information may include a video frame type, a video frame size, a frame rate and a bit rate, and certainly may also include other information, for example, a video frame quantization parameter and the like. The complexity calculating unit 902 determines video content complexity according to the video stream information. The video content complexity may include temporal complexity or space complexity, or both the temporal complexity and the space complexity. When the temporal complexity is calculated, the temporal complexity may be specifically determined according to a size of an I frame in a video frame and the bit rate acquired by the foregoing step, and may also be determined according to the number of bytes corresponding to each pixel of a P frame corresponding to a quantization parameter when the video stream information further include video frame quantization parameter information. When the space complexity is calculated, the space complexity may be specifically determined according to a size of a P frame in a video frame and the bit rate, and may also be determined according to the number of bytes corresponding to each pixel of an I frame corresponding to the quantization parameter when the video stream information further includes the video frame quantization parameter information. Finally, the quality evaluating unit 903 may determine video coding compression quality according to the bit rate, the frame rate and the video content complexity; and may also first determine a video coding compression distortion according to the bit rate and the video content complexity and then determine the video coding compression quality according to the video coding compression distortion and the frame rate.

In this embodiment of the present invention, by acquiring video coding compression quality by the foregoing units, it is not necessary for the apparatus to acquire a complete original reference video and a terminal video and deeply analyze a specific MV or residual. This greatly reduces video quality assessment complexity and the assessment may be performed in real time. In addition, because impact of video content characteristics (namely, video content complexity) and impact of a frame rate are considered, the assessed coding compression quality meets the subjective feeling of human eyes better.

Figure 10:
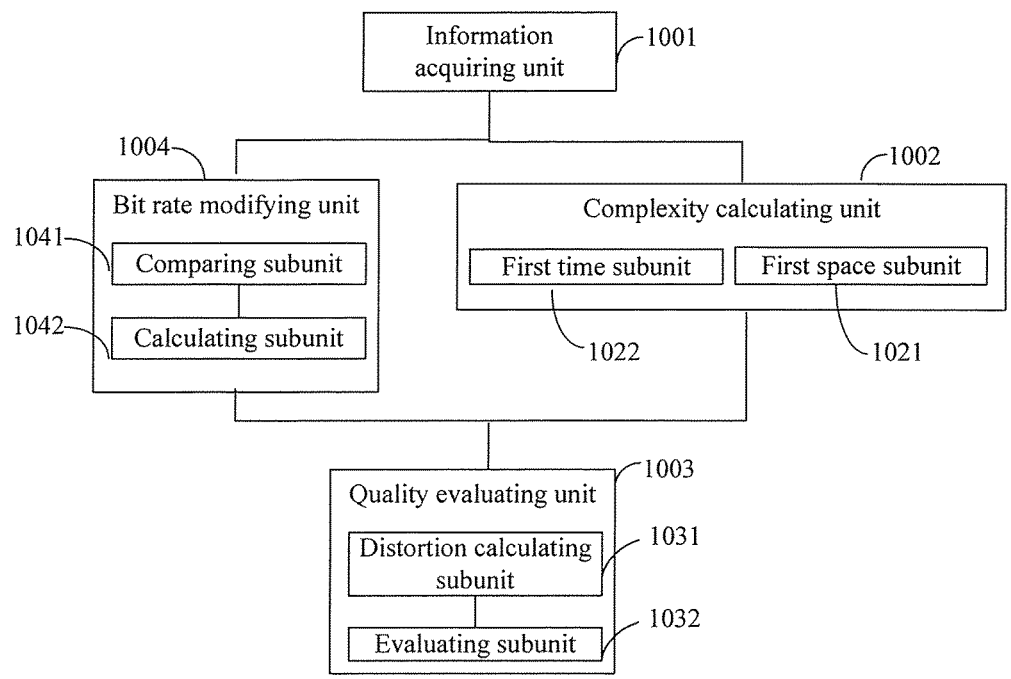
FIG. 10 is a block diagram of a second embodiment of an apparatus for acquiring video coding compression quality according to the present invention.

Referring to FIG. 10, FIG. 10 is a block diagram of a second embodiment of an apparatus for acquiring video coding compression quality according to the present invention.

In this embodiment, except an information acquiring unit 1001, a complexity calculating unit 1002 and a quality evaluating unit 1003, the apparatus may further include a bit rate modifying unit 1004.

In this embodiment, the information acquiring unit 1001 may include: a bit rate acquiring subunit configured to acquire the total data volume of a video stream within a predetermined time period and determine a bit rate according to a ratio of the total data volume of the video stream to the predetermined time period.

The complexity calculating unit 1002 may include:

a first time subunit 1021, configured to: when a video content complexity includes temporal complexity, calculate an average size of I frames within the predetermined time period according to a video frame type and a video frame size; and determine the temporal complexity according to a ratio of the bit rate to the average size of the I frames; and a first space subunit 1022, configured to: when the video content complexity includes space complexity, calculate an average size of P frames within the predetermined time period according to the video frame type and the video frame size; and determine the space complexity according to a ratio of the bit rate and the average size of the P frames.

The bit rate modifying unit 1004 is configured to calculate a modified bit rate according to the bit rate and a frame rate before the quality evaluating unit 1003 determines video coding compression quality according to the bit rate, the frame rate and the video content complexity. The bit rate modifying unit 1004 may further include:

a comparing subunit 1041, configured to determine a smaller value between the frame rate acquired by the information acquiring unit 1001 and a reference frame rate; and a calculating subunit 1042, configured to determine the modified bit rate according to a ratio of the bit rate to the smaller value.

The quality evaluating unit 1003 is specifically configured to calculate the video coding compression quality according to the modified bit rate acquired by the bit rate modifying unit 1004, the frame rate and the video content complexity. The quality evaluating unit 1003 may include:

a distortion calculating subunit 1031, configured to calculate a video coding compression distortion according to the modified bit rate acquired by the bit rate modifying unit 1004, the video content complexity and a video quality assessment parameter; and an evaluating subunit 1032, configured to calculate the video coding compression quality according to the video coding compression distortion and the frame rate. The evaluating subunit 1032 is specifically configured to, when the frame rate is greater than or equal to 24, use a difference between a maximum value of the video quality assessment parameter and the video coding compression distortion as the video coding compression quality; or when the frame rate is less than or equal to 24, modify, based on the video content complexity and the frame rate, a difference between a maximum value of the video quality assessment parameter and the video coding compression distortion, and use the modified result as the video coding compression quality.

In another embodiment of the present invention, if the video stream information acquired by the information acquiring unit further includes a video frame quantization parameter, the complexity calculating unit may include:

a second time subunit, configured to, when the video stream information acquired by the information acquiring unit further includes the video frame quantization parameter and the video content complexity includes the temporal complexity, calculate the number of bits of each pixel of the P frames in a case of the video frame quantization parameter according to the video frame type; and calculate the temporal complexity according to the number of bits of each pixel of the P frames and a first parametric value corresponding to the video frame quantization parameter; and a second space subunit, configured to, when the video stream information acquired by the information acquiring unit further includes the video frame quantization parameter and the video content complexity includes the space complexity, calculate the number of bits of each pixel of the I frames in a case of the video frame quantization parameter according to the video frame type; and calculate the space complexity according to the number of bits of each pixel of the I frames and a second parametric value corresponding to the video frame quantization parameter.

After the video content complexity is acquired by the complexity calculating unit, the video coding quality may also be acquired by the bit rate modifying unit 1004 and the quality evaluating unit 1003.

In this embodiment of the present invention, by acquiring video coding compression quality by the foregoing units, it is not necessary for the apparatus to acquire a complete original reference video and a terminal video and deeply analyze a specific MV or residual. This greatly reduces video quality assessment complexity and the assessment may be performed in real time. In addition, because impact of video content characteristics (namely, video content complexity) and impact of a frame rate are considered, the assessed coding compression quality meets the subjective feeling of human eyes better.

Figure 11:
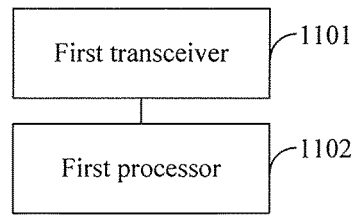
FIG. 11 is a block diagram of a first embodiment of a terminal according to the present invention.

Referring to FIG. 11, FIG. 11 is a block diagram of a first embodiment of a terminal according to the present invention.

In this embodiment, the terminal may include a first transceiver 1101 and a first processor 1102.

The first transceiver 1101 is configured to receive a video stream.

The first processor 1102 is configured to: acquire video stream information from the video stream received by the first transceiver 1101, where the video stream information includes a video frame type, a video frame size, a frame rate and a bit rate; calculate video content complexity according to the video stream information, where the video content complexity includes temporal complexity or space complexity or both the temporal complexity and the space complexity; and calculate video coding compression quality according to the bit rate, the frame rate and the video content complexity.

In this embodiment, the terminal may be disposed at a receive end of a video stream to acquire video coding compression quality. The terminal greatly reduces video quality assessment complexity and the assessment may be performed in real time. In addition, because impact of video content characteristics (namely, video content complexity) and impact of a frame rate are considered, the assessed coding compression quality meets the subjective feeling of human eyes better.

Figure 12:
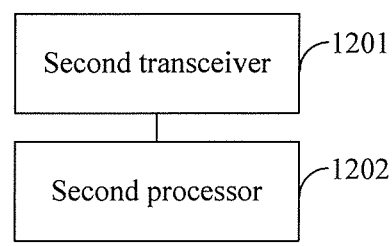
FIG. 12 is a block diagram of a second embodiment of a terminal according to the present invention.

Referring to FIG. 12, FIG. 12 is a block diagram of a second embodiment of a terminal according to the present invention.

In this embodiment, the terminal may include a second transceiver 1201 and a second processor 1202.

The second transceiver 1201 is configured to send a video stream.

The second processor 1202 is configured to: acquire video stream information from the video stream sent by the second transceiver 1201, where the video stream information includes a video frame type, a video frame size, a frame rate and a bit rate; calculate video content complexity according to the video stream information, where the video content complexity includes temporal complexity or space complexity or both the temporal complexity and the space complexity; and calculate video coding compression quality according to the bit rate, the frame rate and the video content complexity.

In this embodiment, the terminal may be disposed at a transmit end of a video stream to acquire video coding compression quality for use in the subsequent video quality assessment. The terminal greatly reduces video quality assessment complexity and the assessment may be performed in real time. In addition, because impact of video content characteristics (namely, video content complexity) and impact of a frame rate are considered, the assessed coding compression quality meets the subjective feeling of human eyes better.

Figure 13:
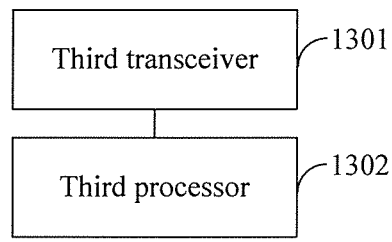
FIG. 13 is a block diagram of an embodiment of a server according to the present invention.

Referring to FIG. 13, FIG. 13 is a block diagram of an embodiment of a server according to the present invention.

The server is located on a network side and may include a third transceiver 1301 and a third processor 1302.

The third transceiver 1301 is configured to transmit a video stream from a transmit end to a receive end.

The third processor 1302 is configured to acquire video stream information from the video stream transmitted by the third transceiver 1301, where the video stream information includes a video frame type, a video frame size, a frame rate and a bit rate; calculate video content complexity according to the video stream information, where the video content complexity includes temporal complexity or space complexity or both the temporal complexity and the space complexity; and calculate video coding compression quality according to the bit rate, the frame rate and the video content complexity.

In this embodiment, the server may be disposed on a network side for transmitting a video stream, so that the server is allowed to acquire video coding compression quality for use in the subsequent video quality assessment. The complexity of assessment of video quality is decreased greatly, so that the assessment may be performed in real time. In addition, as the impact of the video content characteristics (namely, the video content complexity) and impact of the frame rate are considered, the assessed coding compression quality meets the subjective feeling of human eyes better.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for acquiring video coding compression quality, the method comprising:
    acquiring video stream information comprising a video frame type, a video frame size, a frame rate, and a bit rate;
    calculating video content complexity according to the video stream information, wherein the video content complexity comprises temporal complexity, space complexity, or both temporal complexity and space complexity;
    calculating video coding compression quality according to the bit rate, the frame rate, and the video content complexity;
    wherein when the video content complexity comprises temporal complexity, calculating video content complexity according to the video stream information comprises:
        calculating an average size of I frames within a predetermined time period according to the video frame type and the video frame size, and
        determining the temporal complexity according to a ratio of the bit rate to the average size of the I frames; and
    wherein when the video content complexity comprises space complexity, calculating video content complexity according to the video stream information comprises:
        calculating an average size of P frames within a predetermined time period according to the video frame type and the video frame size, and
        determining the space complexity according to a ratio of the bit rate to the average size of the P frames.

2. The method according to claim 1, wherein acquiring video stream information comprises:
    acquiring the video frame type, the video frame size, and the frame rate;
    acquiring a total data volume of a video stream within the predetermined time period; and
    determining the bit rate according to a ratio of the total data volume of the video stream to the predetermined time period.

3. The method according to claim 2, wherein the total data volume of the video stream is a sum of a data volume of received video stream and a data volume of lost video stream.

4. The method according to claim 1, wherein the temporal complexity comprises:

$$TCC = \operatorname{Min}\left(\sqrt{\left(\frac{BR}{ABI}\right)/a_0}, 1\right),$$

wherein TCC is the temporal complexity, BR is the bit rate, ABI is the average size of I frames, and $a_0$ is a constant.

5. The method according to claim 1, wherein:
    before calculating video coding compression quality according to the bit rate, the frame rate, and the video content complexity, the method further comprises:
        calculating a modified bit rate according to the bit rate and the frame rate; and
    calculating video coding compression quality according to the bit rate, the frame rate, and the video content complexity further comprises:
        calculating the video coding compression quality according to the modified bit rate, the frame rate, and the video content complexity.

6. The method according to claim 5, wherein calculating a modified bit rate according to the bit rate and the frame rate comprises:
    determining a smaller value between the frame rate and a reference frame rate; and
    determining the modified bit rate according to a ratio of the bit rate to the smaller value.

7. The method according to claim 6, wherein the modified bit rate comprises:

$$MBR = \frac{BR}{\operatorname{Min}(fps, 30)} \cdot 30,$$

wherein MBR is the modified bit rate, BR is the bit rate, fps is the frame rate, and 30 is the reference frame rate.

8. The method according to claim 5, wherein calculating the video coding compression quality according to the modified bit rate, the frame rate, and the video content complexity further comprises:
    calculating a video coding compression distortion according to the modified bit rate, the video content complexity, and a video quality assessment parameter; and
    calculating the video coding compression quality according to the video coding compression distortion and the frame rate.

9. The method according to claim 8, wherein when the video content complexity comprises temporal complexity only, the video coding compression distortion comprises:

$$VD_c = \frac{MOS_{max} - MOS_{min}}{1 + \left(\frac{MBR}{a_1 \cdot TCC + a_2}\right)^{(a_3 \cdot TCC + a_4)}},$$

wherein VDc is the video coding compression distortion, MOS is the video quality assessment parameter, $MOS_{max}$ is a maximum value of the video quality assessment parameter, $MOS_{min}$ is a minimum value of the video quality assessment parameter, MBR is the modified bit rate, TCC is the temporal complexity, and $a_1$, $a_2$, $a_3$ and $a_4$ are constants.

10. The method according to claim 8, wherein calculating the video coding compression quality according to the video coding compression distortion and the frame rate comprises:
    when the frame rate is greater than or equal to 24, using a difference between a maximum value of the video quality assessment parameter and the video coding compression distortion as the video coding compression quality; and when the frame rate is less than or equal to 24, modifying, based on the video content complexity and the frame rate, a difference between the maximum value of the video quality assessment parameter and the video coding compression distortion, and using the modified difference as the video coding compression quality.

11. The method according to claim 10, wherein the video coding compression quality comprises:

$$VMOS_c = \begin{cases} MOS_{max} - VD_c, & fps \geq 24 \\ (MOS_{max} - VD_c) \cdot \left(1 + a_5 \cdot TCC - b_5 \cdot TCC \cdot \log\left(\frac{1000}{fps}\right)\right), & fps < 24 \end{cases}.$$

12. An apparatus for acquiring video coding compression quality, the apparatus comprising:
at least one processor configured to:
  acquire video stream information comprising a video frame type, a video frame size, a frame rate, and a bit rate;
  calculate video content complexity according to the video stream information, wherein the video content complexity comprises temporal complexity, space complexity, or both temporal complexity and space complexity;
  calculate video coding compression quality according to the bit rate, the frame rate, and the video content complexity;
  wherein when the video content complexity comprises temporal complexity, to calculate the video content complexity according to the video stream information, the at least one processor is configured to:
    calculate an average size of I frames within a predetermined time period according to the video frame type and the video frame size, and
    determine the temporal complexity according to a ratio of the bit rate to the average size of the I frames; and
  wherein when the video content complexity comprises space complexity, to calculate video content complexity according to the video stream information, the at least one processor is configured to:
    calculate an average size of P frames within a predetermined time period according to the video frame type and the video frame size, and
    determine the space complexity according to a ratio of the bit rate to the average size of the P frames.

13. The apparatus according to claim 12, wherein the at least one processor is further configured to:
acquire a total data volume of a video stream within the predetermined time period; and
determine the bit rate according to a ratio of the total data volume of the video stream to the predetermined time period.

14. The apparatus according to claim 12, wherein the at least one processor is further configured to:
calculate a modified bit rate according to the bit rate and the frame rate before the video coding compression quality according to the bit rate, the frame rate, and the video content complexity is calculated; and
calculate the video coding compression quality according to the modified bit rate, the frame rate, and the video content complexity.

15. The apparatus according to claim 14, wherein the at least one processor is further configured to:
determine a smaller value between the frame rate and a reference frame rate; and
determine the modified bit rate according to a ratio of the bit rate to the smaller value.

16. The apparatus according to claim 14, wherein the at least one processor is further configured to:
calculate a video coding compression distortion according to the modified bit rate, the video content complexity, and a video quality assessment parameter; and
calculate the video coding compression quality according to the video coding compression distortion and the frame rate.

17. The apparatus according to claim 16, wherein the at least one processor is further configured to:
when the frame rate is greater than or equal to 24, use a difference between a maximum value of the video quality assessment parameter and the video coding compression distortion as the video coding compression quality; and
when the frame rate is less than or equal to 24, modify, based on the video content complexity and the frame rate, a difference between the maximum value of the video quality assessment parameter and the video coding compression distortion, and use the modified result difference as the video coding compression quality.

18. A terminal, comprising:
a transceiver configured to receive a video stream; and
at least one processor configured to:
  acquire video stream information from the video stream received by the transceiver, wherein the video stream information comprises a video frame type, a video frame size, a frame rate, and a bit rate,
  calculate video content complexity according to the video stream information, wherein the video content complexity comprises temporal complexity, space complexity, or both temporal complexity and space complexity, and
  calculate video coding compression quality according to the bit rate, the frame rate, and the video content complexity;
  wherein when the video content complexity comprises temporal complexity, to calculate the video content complexity according to the video stream information, the at least one processor is configured to:
    calculate an average size of I frames within a predetermined time period according to the video frame type and the video frame size, and
    determine the temporal complexity according to a ratio of the bit rate to the average size of the I frames; and
  wherein when the video content complexity comprises space complexity, to calculate video content complexity according to the video stream information, the at least one processor is configured to:
    calculate an average size of P frames within a predetermined time period according to the video frame type and the video frame size, and
    determine the space complexity according to a ratio of the bit rate to the average size of the P frames.

19. The terminal according to claim 18, wherein the at least one processor is further configured to:
acquire a total data volume of a video stream within the predetermined time period; and
determine the bit rate according to a ratio of the total data volume of the video stream to the predetermined time period.

20. The terminal according to claim 18, wherein the temporal complexity comprises:

$$TCC = \text{Min}\left(\sqrt{\left(\frac{BR}{ABI}\right)/a_0}, 1\right),$$

wherein TCC is the temporal complexity, BR is the bit rate, ABI is the average size of I frames, and a0 is a constant.

21. The terminal according to claim 18, wherein the at least one processor is further configured to:
calculate a modified bit rate according to the bit rate and the frame rate; and
calculate the video coding compression quality according to the modified bit rate, the frame rate, and the video content complexity.

22. The terminal according to claim 21, wherein the at least one processor is further configured to:
determine a smaller value between the frame rate and a reference frame rate; and
determine the modified bit rate according to a ratio of the bit rate to the smaller value.

23. The terminal according to claim 22, wherein the modified bit rate is:

$$MBR = \frac{BR}{\text{Min}(fps, 30)} \cdot 30,$$

wherein MBR is the modified bit rate, BR is the bit rate, fps is the frame rate, and 30 is the reference frame rate.

24. The terminal according to claim 21, wherein the at least one processor is further configured to:
calculate a video coding compression distortion according to the modified bit rate, the video content complexity, and a video quality assessment parameter; and
calculate the video coding compression quality according to the video coding compression distortion and the frame rate.

25. The terminal according to claim 24, wherein the video coding compression distortion comprises:

$$VD_c = \frac{MOS_{max} - MOS_{min}}{1 + \left(\frac{MBR}{a_1 \cdot TCC + a_2}\right)^{(a_3 \cdot TCC + a_4)}},$$

wherein $VD_c$ is the video coding compression distortion, MOS is the video quality assessment parameter, $MOS_{max}$ is a maximum value of the video quality assessment parameter, $MOS_{min}$ is a minimum value of the video quality assessment parameter, MBR is the modified bit rate, TCC is the temporal complexity, and $a_1$, $a_2$, $a_3$ and $a_4$ are constants.

26. The terminal according to claim 24, wherein the at least one processor is further configured to:
when the frame rate is greater than or equal to 24, use a difference between a maximum value of the video quality assessment parameter and the video coding compression distortion as the video coding compression quality; and
when the frame rate is less than 24, modify, based on the video content complexity and the frame rate, a difference between the maximum value of the video quality assessment parameter and the video coding compression distortion, and use the modified difference as the video coding compression quality.

* * * * *